(12) United States Patent
Sheffield et al.

(10) Patent No.: US 9,744,753 B2
(45) Date of Patent: Aug. 29, 2017

(54) COMPOSITE WOOD FLOORING AND METHOD OF MAKING THE SAME

(71) Applicant: WABASH NATIONAL, L.P., Lafayette, IN (US)

(72) Inventors: Matthew S. Sheffield, Harrison, AR (US); Eddie J. Bartlett, Harrison, AR (US); Timothy D. Cantwell, Green Forest, AR (US)

(73) Assignee: Wabash National, L.P., Lafayette, IN (US)

( * ) Notice: Subject to any disclaimer, the term of this patent is extended or adjusted under 35 U.S.C. 154(b) by 211 days.

(21) Appl. No.: 14/615,927

(22) Filed: Feb. 6, 2015

(65) Prior Publication Data

US 2015/0224670 A1     Aug. 13, 2015

Related U.S. Application Data

(60) Provisional application No. 61/938,724, filed on Feb. 12, 2014.

(51) Int. Cl.
| | |
|---|---|
| *B27K 3/15* | (2006.01) |
| *B32B 37/15* | (2006.01) |
| *B29C 70/78* | (2006.01) |
| *B29D 99/00* | (2010.01) |
| *B29L 31/30* | (2006.01) |
| *B32B 37/20* | (2006.01) |
| *B32B 37/22* | (2006.01) |

(52) U.S. Cl.
CPC ............ *B32B 37/15* (2013.01); *B27K 3/15* (2013.01); *B29C 70/78* (2013.01); *B29D 99/001* (2013.01); *B29L 2031/30* (2013.01); *B29L 2031/3017* (2013.01); *B32B 37/206* (2013.01); *B32B 37/226* (2013.01); *B32B 2305/10* (2013.01); *B32B 2309/12* (2013.01); *B32B 2313/04* (2013.01); *B32B 2317/16* (2013.01); *B32B 2607/00* (2013.01)

(58) Field of Classification Search
None
See application file for complete search history.

(56) References Cited

U.S. PATENT DOCUMENTS

| | | | |
|---|---|---|---|
| 5,509,715 | A | 4/1996 | Scharpf |
| 5,662,761 | A * | 9/1997 | Middelman ........... B29C 70/083 156/166 |
| 6,558,765 | B2 | 5/2003 | Padmanabhan |
| 6,558,766 | B2 | 5/2003 | Padmanabhan |
| 6,601,357 | B2 | 8/2003 | Tunis |
| 7,765,758 | B2 | 8/2010 | Chorney et al. |
| 7,972,707 | B2 | 7/2011 | Padmanabhan |
| 8,337,994 | B2 | 12/2012 | Padmanabhan |
| 2001/0003623 | A1 | 6/2001 | Padmanabhan |
| 2001/0035264 | A1 | 11/2001 | Padmanabhan |
| 2005/0266200 | A1 | 12/2005 | Padmanabhan |

(Continued)

*Primary Examiner* — Erma Cameron
(74) *Attorney, Agent, or Firm* — Carli E Stewart

(57) ABSTRACT

A method of making a composite panel configured for use with a flooring assembly of a trailer includes providing a wood substrate, making an uncured fiber-reinforced coating, and applying the uncured fiber-reinforced coating onto a surface of the wood substrate. The method further includes curing the uncured fiber-reinforced coating after applying the uncured fiber-reinforced coating onto the surface of the wood substrate.

22 Claims, 5 Drawing Sheets

(56) References Cited

U.S. PATENT DOCUMENTS

| | | |
|---|---|---|
| 2006/0179733 A1 | 8/2006 | Padmanabhan |
| 2011/0223328 A1 | 9/2011 | Padmanabhan |
| 2013/0115412 A1 | 5/2013 | Padmanabhan |

* cited by examiner

COMPOSITE WOOD FLOORING AND METHOD OF MAKING THE SAME

This application claims priority under 35 U.S.C. §119(e) to U.S. Provisional Patent Application Ser. No. 61/938,724 filed Feb. 12, 2014 entitled COMPOSITE WOOD FLOORING AND METHOD OF MAKING THE SAME, the entirety of which is hereby incorporated by reference herein.

FIELD OF THE INVENTION

The present invention relates generally to composite wood flooring for storage containers, such as dry-van trailers, refrigerated van trailers, truck bodies, and/or mobile storage containers.

BACKGROUND

Many storage containers, such as mobile storage containers and/or truck trailers, for example, include wood flooring oftentimes manufactured using laminated floor boards made from oak, maple, birch, or beech woods. The underside of the floor boards may be coated with a thin polymer coating to provide moisture protection. Alternatively, composite wood flooring including a laminated wood with a polymer reinforcement may be used as well.

In some applications, composite reinforced boards may be created through the use of a multi-step process wherein a fiber reinforced sheet is fabricated using either pultrusion or double pressure belt compositing technologies. Such fiber reinforced sheets may include varies resins such as epoxies, urethanes, as well as polyesters, for example, in addition to various woven or non-woven fibers made from glass, carbon, aramid, polyethylene, basalt, cotton, jute, and/or hemp, for example. The fiber reinforced sheets are cured and may then be placed onto rolls in order to later be used to laminate the pre-formed sheet onto a wood or foam substrate. For example, the fiber reinforced sheet may later be unrolled and laminated to the bottom surface of the substrate. In a typical application, a reactive hotmelt adhesive may be used to between the pre-cured fiber reinforced sheet and the substrate in order to adhere the fiber reinforced sheet to the substrate. Alternative adhesives may include thermoset polyurethanes or epoxies. Such a two-step process requires curing the fiber reinforced sheet prior to such a sheet being laminated onto a substrate such as a wood board. Further, this two-step process typically requires the use of an adhesive

SUMMARY

The present invention may comprise one or more of the features recited in the attached claims, and/or one or more of the following features and combinations thereof.

According to one aspect of the present disclosure, a composite panel configured for use with a flooring assembly of a trailer includes a wood substrate defining a longitudinal axis. A coating of the composite panel includes (i) plurality of first fibers configured to extend perpendicular to the longitudinal axis of the wood substrate, (ii) a plurality of second fibers configured to extend parallel to the longitudinal axis of the wood substrate, and (ii) a resin matrix around the plurality of first and second fibers.

In one illustrative embodiment, the first and second fibers may be made from different materials. Illustratively, the first fibers may be glass fibers and the second fibers may be carbon fibers.

In another illustrative embodiment, the composite panel is void of any adhesive between the coating and the wood substrate.

In yet another embodiment, the first fibers may be stitched together to define a mat.

In still another illustrative embodiment, the second fibers may be individual rovings that are not connected to one another.

In yet another illustrative embodiment, the first fibers may be adjacent a bottom surface of the wood substrate and the second fibers may be spaced-apart from the bottom surface of the wood substrate to position the first fibers between the top surface of the wood substrate and the second fibers.

In still another illustrative embodiment, the resin matrix may include clay and/or fumed silica.

In yet another illustrative embodiment, the coating may include between 25% and 85% second fibers by weight. Further illustratively, the coating may include at least 50% first fibers by weight.

According to another aspect of the present disclosure, a method of making a composite panel configured for use with a flooring assembly of a trailer includes providing a wood substrate, making an uncured fiber-reinforced coating, and applying the uncured fiber-reinforced coating onto a surface of the wood substrate. The method also includes curing the uncured fiber-reinforced coating after applying the uncured fiber-reinforced coating onto the surface of the wood substrate.

In one illustrative embodiment, making the uncured fiber-reinforced coating may include (i) orienting a plurality of individual fiber rovings along a longitudinal axis of the wood substrate, (ii) positioning a fiber mat adjacent the plurality of individual fiber rovings, and (iii) feeding the plurality of fiber rovings and the fiber mat through a resin bath. Illustratively, the fiber mat may include a plurality of uni-directional fibers. Further, positioning the fiber mat adjacent the plurality of individual fiber rovings may include orienting the plurality of uni-directional fibers of the fiber mat perpendicular to the plurality of individual fiber rovings. Applying the uncured fiber-reinforced coating may include placing the fiber mat directly adjacent the surface of the wood substrate.

In another illustrative embodiment, the method may also include applying a release film on top of adjacent an outer surface of the uncured fiber-reinforced coating before curing the uncured fiber-reinforced coating.

In still another illustrative embodiment, curing the uncured fiber-reinforced coating may include advancing the wood substrate, including the uncured fiber-reinforced coating thereon, through a heated die. Alternatively, curing the uncured fiber-reinforced coating may include advancing the wood substrate, including the uncured fiber-reinforced coating thereon, through a heated double belt press. In this embodiment, the double belt press may be an isobaric double belt press.

In yet another illustrative embodiment, curing the uncured fiber-reinforced coating may include advancing the wood substrate, including the uncured fiber-reinforced coating thereon, between an isobaric pressure assembly and a heated platen. Illustratively, the isobaric pressure assembly may include a plurality of rocker-arm pressure wheels in fluid communication with one or more pneumatic bellows. Further illustratively, the isobaric pressure assembly may include a belt drive.

In still another illustrative embodiment, the method may also include preheating the wood substrate prior to applying the uncured fiber-reinforced coating onto the surface of the wood substrate.

According to another aspect of the present disclosure, a method of making a composite panel configured for use with a flooring assembly of a trailer includes providing a wood substrate, making an uncured fiber-reinforced coating, and applying the uncured fiber-reinforced coating directly onto a surface of the wood substrate without the use of an adhesive between the uncured fiber-reinforced coating and the surface of the wood substrate to create an uncured composite assembly. The method also includes applying heat to the uncured composite assembly in order to cure the uncured fiber-reinforced coating on the wood substrate.

In one illustrative embodiment, the method may also include applying a release film on top of the uncured fiber-reinforced coating before applying heat to the uncured fiber-reinforced coating.

In another illustrative embodiment, the composite panel may consist of a wood substrate defining a longitudinal axis, and a coating including a (i) plurality of first fibers configured to extend perpendicular to the longitudinal axis of the wood substrate, (ii) a plurality of second fibers configured to extend parallel to the longitudinal axis of the wood substrate, and (ii) a resin matrix around the plurality of first and second fibers.

In still another illustrative embodiment, making the uncured fiber-reinforced coating may include (i) orienting a plurality of individual fiber rovings along a longitudinal axis of the wood substrate, (ii) positioning a fiber mat adjacent the plurality of individual fiber rovings, and (iii) advancing the plurality of fiber rovigins and the fiber mat through a resin bath, and wherein applying the uncured fiber-reinforced coating includes orienting the uncured fiber-reinforced coating to locate the fiber mat adjacent the surface of the wood substrate and to locate the plurality of individual rovings spaced-apart from the surface of the wood substrate to position the fiber mat between the surface of the wood substrate and the plurality of fiber rovings. Illustratively, making the uncured fiber-reinforced coating may also include adding at least one of clay and fumed silica to the resin bath.

In yet another illustrative embodiment, the method may also include applying constant pressure to the uncured composite assembly. Illustratively, the constant pressure may be approximately between 5-35 psi. Further illustratively, applying the constant pressure may include advancing the uncured composite assembly through an isobaric pressure system including and isobaric pressure mechanism having a plurality of pneumatic bellows and a plurality of rocker-arm pressure wheels coupled to the plurality of pneumatic bellows.

In still another illustrative embodiment, the method may also include abrading the surface of the wood substrate before applying the uncured fiber-reinforced coating directly onto the surface of the wood substrate.

According to still another aspect of the present disclosure, a method of making a composite panel configured for use with a flooring assembly of a trailer includes advancing a wood substrate through a coating system to apply a wet, uncured fiber reinforced coating to one surface of the wood substrate to create an uncured composite assembly. The method also includes advancing the uncured composite assembly through a curing system to apply heat to the uncured composite assembly and cure the uncured fiber reinforced coating when the fiber reinforced-coating is on the wood substrate in order to create the composite panel. Illustratively, advancing the wood substrate through the coating system and advancing the uncured composite assembly through a curing system occur in a single, continuous manufacturing line.

DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other mobile or stationary storage containers, as well as refrigerated and un-refrigerated trailers or storage containers, straight truck bodies, small personal and/or commercial trailers and the like.

Figure 1:
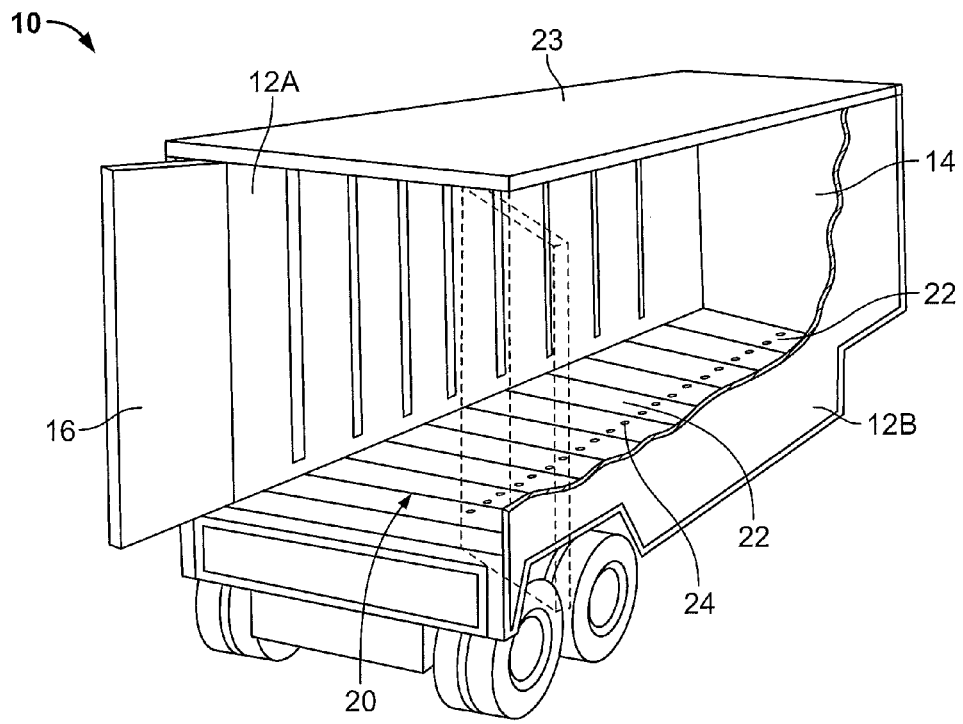
FIG. 1 is a perspective and partial cutaway view of a trailer having a composite wood flooring.

Referring now to FIG. 1, a perspective and partial cutaway view is shown of a trailer 10 having a composite wood flooring 20 including a plurality of composite floor boards 22. Illustratively, the trailer 10 is a conventional box or van type trailer that is towable by a heavy duty truck or tractor, although it will be understood that the composite wood flooring 20 may be used with other trailer types and other containers such as mobile storage container and containers for straight trucks, for example. In the illustrative embodiment, the trailer 10 includes a pair of opposite side walls 12A and 12B that extend the length of the trailer 10, a front wall 14 attached to and between the side walls 12A and 12B at one end thereof and a rear frame assembly attached to and between the side walls 12A and 12B. The composite wood flooring 20 extends the length of the trailer 10 between the side walls 12A and 12B. A roof structure 23 likewise extends the length of the trailer 10 and is attached along the tops of the trailer side walls 12A, 12B, the front wall 14, and the rear frame assembly 16.

Figure 2:
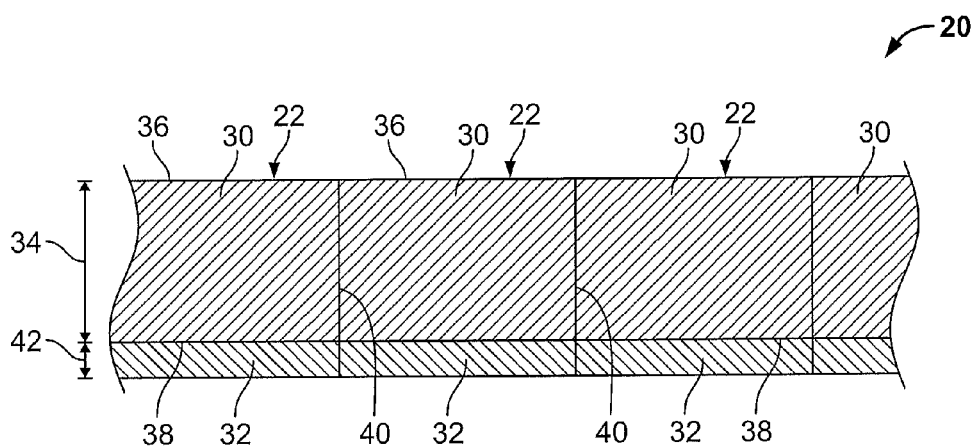
FIG. 2 is a sectional view of the composite wood floor boards showing the composite wood boards including a laminate wood board and polymer coating.

Referring now to FIG. 2, a sectional view of the composite wood flooring 20 is shown. As noted above, the composite wood flooring 20 includes a plurality of individual composite boards 22. Conventionally, the composite boards 22 are coupled to I-beams (not shown) of the trailer 10 which run laterally across the width of the trailer 10. Illustratively, each board 22 is secured to the cross-members by screws 24 extending through the thickness of the board 22 and into the cross-members.

As shown in FIG. 2, each composite board 22 includes an engineered laminate wood board, or substrate, 30 and a fiber-reinforced coating 32. Illustratively, the laminate wood board 30 may be manufactured from hardwoods such as ash, aspen, elm, yellow-poplar, oak, maple, birch, beech, and the like. However, it is within the scope of this disclosure for various softwoods to be used as well. In preferred embodiments, the laminate wood board 30 is made from oak. Furthermore, it is within the scope of this disclosure to include solid wood (i.e., non-laminate) boards as well. For example, the boards may be made of plywood, particle board, and/or OSB. Further alternatively, while the composite board 22 includes a wood substrate 30, it is also within the scope of this disclosure for the composite boards 22 to each include a foam or plastic substrate.

The laminate wood boards 30 may be constructed using conventional methods of preparing laminate wood floor boards. Illustratively, wood boards 30 of the present disclosure may be cut or planed to a thickness 34 that is typically thinner than a conventional laminate wood board used for flooring within a trailer or other mobile storage container. For example, the thickness of a conventional wood board is typically 1⅜", whereas the thickness 34 of the laminate wood boards 30 forming the composite flooring 20 may be approximately between 1" to 1⅛". In preferred embodiments, the wood boards 30 are approximately 1⅛" thick.

As shown in FIG. 2, each wood board 30 includes a top surface 36, a bottom surface 38, and two side surfaces 40. Illustratively, the fiber-reinforced coating 32 is bonded to the bottom surface 38 of the wood boards 30 to form the composite boards 22. As is discussed in greater detail below, the fiber-reinforced coating 32 is applied in a "wet", or uncured, state to the bottom surface 38 of the wood boards 30 and is subsequently cured onto the wood boards 30 to form the cured fiber-reinforced coating 32 shown in FIG. 2. Although the coating 32 is bonded to the bottom surface 38 of the wood boards 30, it is within the scope of this disclosure to include a composite board having a laminate wood board and a coating on both the top and bottom surfaces of the laminate wood board. Further illustratively, the coating 32 may include a thickness 42 of between approximately 0.010" and 0.150", and specifically may define a thickness 42 of approximately 0.063". However, the coating 32 may be any suitable thickness.

Figure 3:
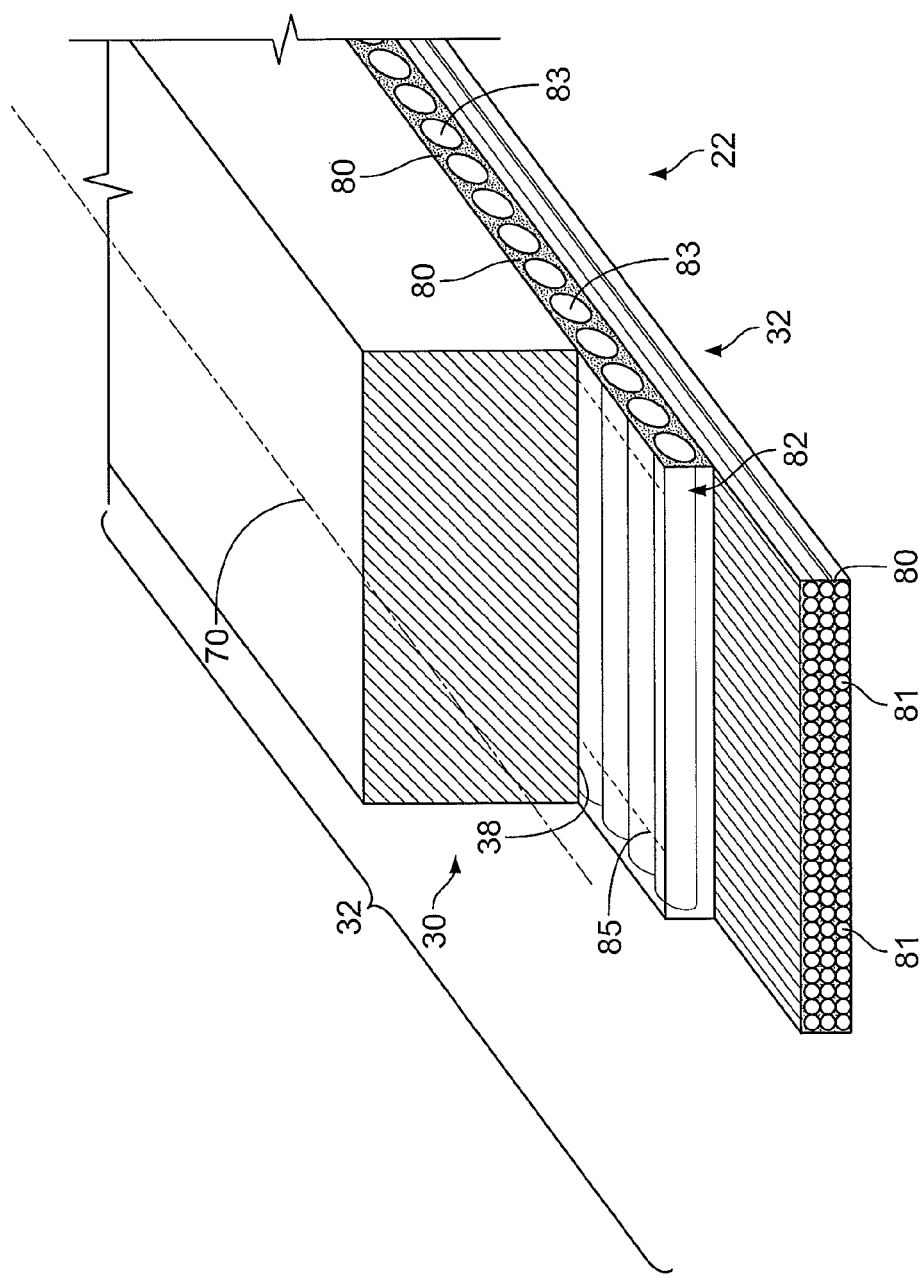
FIG. 3 is a schematic illustration of a composite wood floor board showing the two-directional fiber-reinforced coating on the bottom surface of the wood board.
Figure 4:
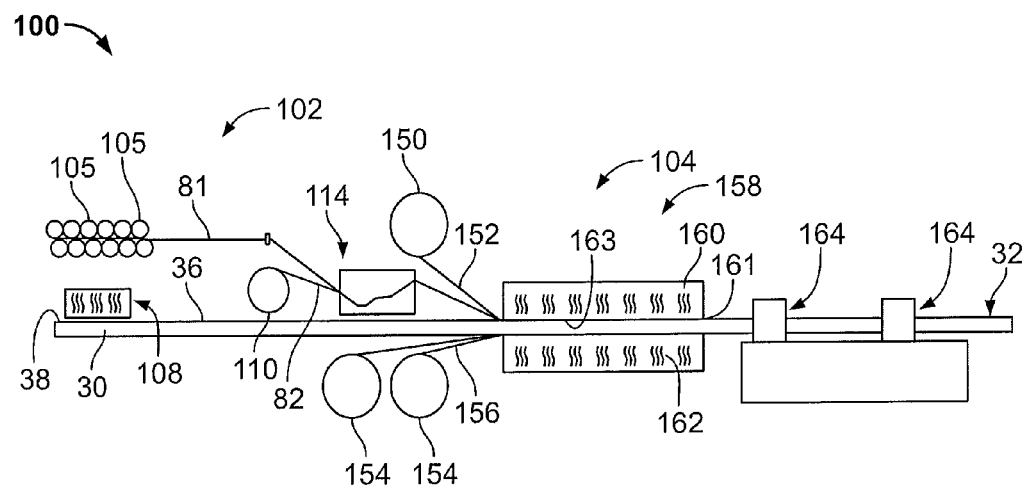
FIG. 4 is a schematic illustration of a pultrusion process for making the composite floor boards of the present disclosure and showing the use of spooled fibers and a resin bath to make the polymer coating that is pultruded onto the bottom surface of the laminated wood boards.
Figure 5:
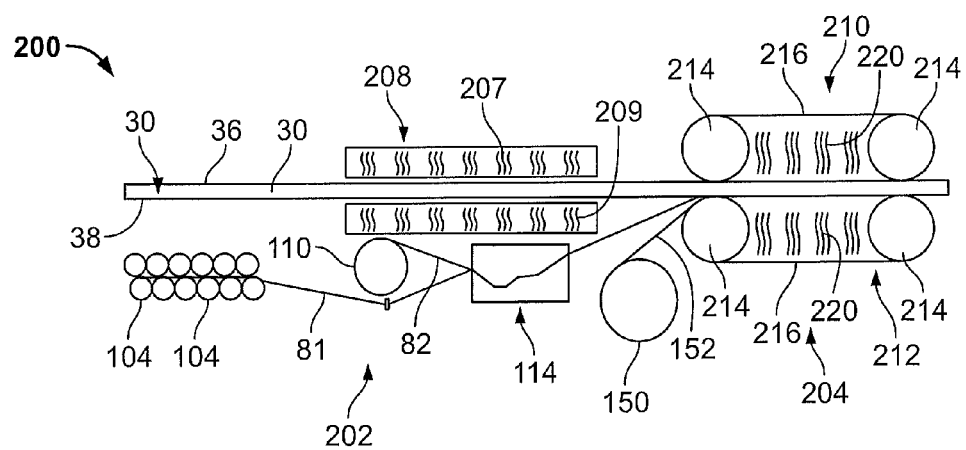
FIG. 5 is a schematic illustration of an alternative process for making the composite floor boards of the present disclosure and showing the use of a double belt press to adhere the polymer coating onto the bottom surface of the laminated wood boards.
Figure 6:
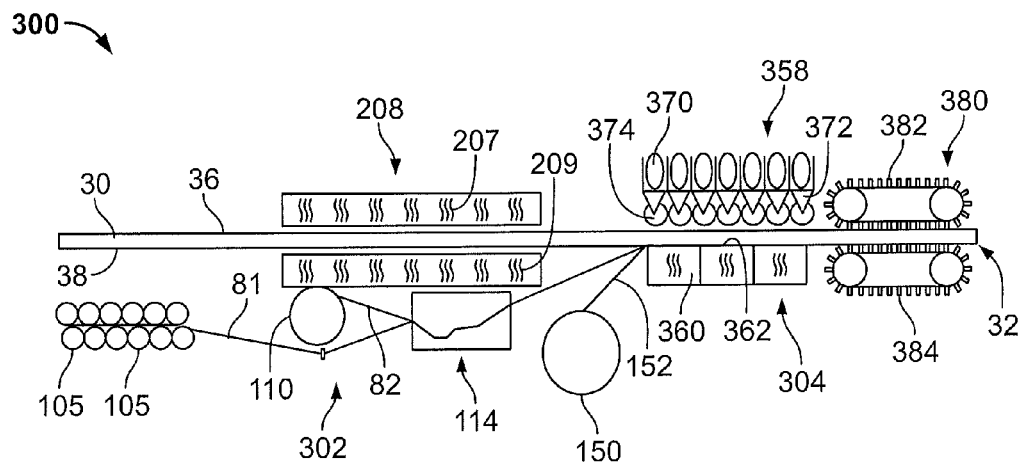
FIG. 6 is a schematic illustration of another alternative process for making the composite floor boards of the present disclosure and showing the use of an isobaric compositing press to adhere the polymer coating onto the bottom surface of the laminated wood boards.

Illustratively, as shown in FIG. 3, the coating 32 operates to coat and seal the bottom surface 38 of the laminate wood boards 30. Furthermore, the coating 32 operates to reinforce and strengthen the wood boards 30 to provide a composite wood flooring 20 suitable for use in the trailer 10 and other storage containers. As shown in FIG. 3, the composition of the coating 32 includes a base material 80 and a plurality of first reinforcing fibers and a plurality of second reinforcing fibers. The first reinforcing fibers are individual fibers 81 which are oriented along a longitudinal axis 70 of the wood boards 30. The individual fibers 81 may be stored on a plurality of fiber spools 105 as shown in FIGS. 4-6 and may be unwound from the spools 105 when used to manufacture the composite boards 22. These individual fibers 81 are not stitched or woven together.

The second reinforcing fibers include a fiber mat 82 of individual fibers 83 which are illustratively stitched together. As is discussed in greater detail below, the fibers 83 are each positioned perpendicular to the longitudinal axis 70 of the wood boards 30 and are stitched together to create the mat 82. The mat 82 may be stored on a spool, or roll, such as the spool 110 shown in FIGS. 4-6 and may be unwound from the spool 110 when used to manufacture the composite boards 22. While the fiber-reinforced coating 32 is shown to include one fiber mat 82, it should be understood that the coating 32 may include multiple fiber mats 82. Illustratively, the mat 82 is a uni-weft mat wherein all of the fibers 83 are positioned in a singular direction (illustratively, the transverse direction) except for the fibers 85 used for stitching the transverse fibers 83 together to form the mat 82. Illustratively, while the mat 82 is a stitched fabric having fibers oriented in one direction, the coating 32 may also include a mat having fibers oriented in a plurality of directions. Further, the coating may include a mat having woven fibers therein. For example, such a woven roving may include a plain weave wherein approximately 50% of the fibers of the mat are located substantially along the longitudinal axis 70 of the board 30 while approximately 50% of the fibers of the mat are generally transverse to the longitudinal axis 70 of the board 30. Other suitable orientations of the fibers within the mat may be used as well. It should be understood that the mat may include any woven, non-woven, stitched, and/or stitch-bonded reinforcement for the coating 32.

Illustratively, as is shown in FIG. 3 and discussed in greater detail below, the mat 82 is located adjacent the bottom surface 38 of the wood boards 30 while the individual fibers 81 of the first reinforcing fibers are positioned adjacent the mat 82 such that the mat 82 is between the individual fibers 81 and the bottom surface 38 of the board 30. It should be understood, however, that the individual fibers 81 may be located between the mat 82 and the boards 30. The base material 80 is located around and among the first and second reinforcing fibers 81, 83 and operates, at least in part, to adhere the first and second reinforcing fibers 81, 83 together and to the bottom surface 38 of the boards 30.

Illustratively, the individual first reinforcing fibers 81 are carbon fibers while the fibers 83 of the mat 82 are glass fibers. The illustrative coating 32 includes between 40% and approximately 50% carbon fibers 81 by weight, but may include any suitable amount of carbon fibers including less than 40% and more than 50%, which are longitudinally-oriented lengthwise along the bottom surface 38 of the boards 30. The illustrative coating 32 further includes a minimum of 50% glass fibers 83 by weight which are 90 degree weft to the longitudinal axis 70 of the boards 30. It should be understood, however, that the coating 32 may include any suitable quantity of first and second fibers 81, 83. Further, it should be understood that the first and second reinforcing fibers 81, 83 may be made of any suitable material including, but not limited to, glass, carbon, aramid, polyethylene, basalt, cotton, jute, and/or hemp, for example. The first and second reinforcing fibers 81, 83 may be made of the same material or may be made from different materials. The first and second reinforcing fibers 81, 83 operate to strengthen and reinforce the boards 30. Varying the fiber type, fiber orientation, and fiber volume operates to control and determine the load bearing and bonding characteristics of the coating 32.

The base material 80 of the coating 32 aides in bonding the first and second reinforcing fibers 81, 83 of the coating 32 to each board 30. The base material 80 further includes suitable bonding and elongation characteristics of approximately 2-5% elongation and a suitable tensile strength of greater than approximately 8000 psi.

The base material 80 may include an epoxy. Illustratively, bisphenol and triethanol amines may be used in the epoxy in order to improve bond strength.

The base material 80 may alternatively include a resin matrix having a polyethylene terephthalate silicone copolyol and/or a polymeric MDI, an inorganic based catalyzing system, such as dibutyl tin dilaurate, for example, and/or an inorganic moisture scavenger. The resin matrix may also include an inorganic filler.

Alternatively, the resin matrix may include a water dispersible, hydrophobic polyethylene terephthalate based polyester. Illustratively, the resin matrix may further include a melamine, a polyacid, and/or wood flour.

In yet another embodiment, the resin matrix may include an unsaturated polyethylene terephthalate based polyester. Illustratively, the resin matrix may further include an inorganic catalyst, wood flour, and/or inorganic fillers.

In still another embodiment, the resin matrix may include a polyethylene terephthalate based polyester elastomer and may further include an inorganic catalyst, wood flour, and/or inorganic fillers.

The resin matrix may also include clay. Clay operates to improve the wet out of the resin matrix during the manufacturing process. Wet out generally describes how well the resin is able to penetrate the bundles of fibers (such as fibers 81 and 83) within the resin. For example, fibers that fail to wet out during the manufacturing process may have resin on the outside of the bundle of fibers, for example, but some fibers within the bundle may be dry and not have any resin on them. The clay may operate to integrate itself throughout the fiber matrix as the coating 32 (including the base material 80 and the fibers 81, 83) bends and flexes through a resin bath 114, as described in more detail below, in order to hold the fibers 81, 83 apart from each other to allow the base material 80 to penetrate to spaces between the fibers 81, 83.

It should be understood that the above-referenced base materials 80 are illustrative in nature only and that the base material 80 of the fiber-reinforced coating 32 is not limited to those particular illustrative embodiments described above. Rather, the base material 80 of the polymer coating 32 may include any suitable resin such as, for example, polyurethane, epoxy, and or polyester chemistries. In particular, the base material 80 may include other components in order to enhance certain desired characteristics of the base material 80 such as elongation and/or bonding characteristics. The amount and type of such added components can be used to vary and control these types of load bearing and bonding characteristics of the fiber-reinforced coating 32. As such, the quantity and composition of the base material 80 as well as the quantity and composition of the reinforcing fibers 81, 83 may be varied in order to control and manipulate the aforementioned characteristics in order to create and optimize a coating suitable for a variety of applications.

Illustratively, FIGS. 4-8 illustrate various methods or processes for manufacturing the composite wood boards 32. For example, the fiber-reinforced coating 32 may be extruded, pultruded, passed through a double-belt press, and/or an isobaric compression press with the wood board 30 in order to form the composite boards 22. In particular, the fiber-reinforced coating 32 is bonded to the bottom surface 38 of the wood boards 30 without the use of an adhesive. In other words, the composite floor boards 32 include only the laminate wood board 30 and the coating 32. While the embodiments disclosed herein do not use an adhesive to attach the fiber-reinforced coating 32 to the laminate boards 30, it is within the scope of this disclosure to include an adhesive, such as a hot-melt adhesive, between the boards 30 and the coating 32.

Looking first to FIG. 4, an assembly 100 for manufacturing a composite board 32 of the present disclosure is provided. The assembly 100 includes a coating system 102 and a pultrusion curing system 104. The coating system 102 operates to create the wet, or uncured, coating 32 to be placed onto the wood substrate 30 to create an uncured composite assembly. The coating system 102 illustratively includes a plurality of carbon spools 105 each including one or more strands of carbon fiber 81. The coating system 102 further includes a preheater 108, a spool 110 of the 90 degree weft glass mat 82 including the glass fibers 83. The coating system 102 further includes a resin bath 114. Alternatively, a resin injection box may be used in place of the resin bath 114. The coating system 102 includes a spool 150 of a release film 152 and one or more spools 154 of a carrier glass 156. As is described in greater detail below, the pultrusion curing system 104 of the assembly 100 includes a heated pultrusion die 158 including upper and lower die components 160, 162, as well as a plurality of reciprocating pullers 164.

Illustratively, a method of forming the composite board 32 includes sanding or abrading the bottom surface 38 of the wood boards 30 prior to placing the coating 32 thereon. For example, the bottom surface 38 may be abraded by planning the bottom surface 38 with sand paper, such 24 grit sand paper. Additional pretreatments include preheating the wood substrate 30 by passing the board 30 under the preheater 108. The preheater 108 operates to flash off moisture and open the pores within the board 30. Preheating the wood boards 30 may also decrease process variation due to variations in temperature between the boards 30 prior to preheating the boards 30 that may cause the coating 32 to adhere unevenly to the bottom surface 38 of the board 30, for example. Preheating the board 30 may also improve surface bonding of the coating 32 onto the board 30. It should be noted that the wood board 30 is positioned in an upside-down orientation, as shown in FIG. 4, such that what is ultimately the bottom surface 38 of the wood board 30 of the composite boards 22 is facing upwardly.

Once the board 30 is preheated, carbon strands 81 from the spools 105 are each oriented along the longitudinal axis 70 of the board 30 and are positioned over and oriented into a common plane with the 90 degree weft glass mat 82 from the spool 150 to create the fiber assembly within the coating 32. The fiber assembly (including the longitudinally-oriented carbon strands 81 and the horizontally-oriented weft glass matt 82) is fed through the resin bath 114 in order to infuse the first and second fibers 81, 83 of the fiber assembly with the base material 80. Alternatively, the fiber assembly may be fed through a resin injection box.

The temperature of the base matrix 80 within the injection box or the bath 114 operates to improve the resin potlife and decrease reaction time variation. Resin injection temperature, pot temperature (i.e., the temperature of the resin in the resin bath), and cure temperature are dependent upon the specific components of the coating 32. For example, while several polyurethanes cure at a die temperature of approximately 280 degrees C., many epoxies require a higher die temperature of approximately 350 degrees C. in order to properly cure. As such, the temperature of the coating 32 throughout the manufacturing process is adjusted depending upon the particular components within the base matrix 80 of the coating 32 as well as the ambient temperature of the surrounding environment in order to optimize and control the cure time, potlife, and viscosity of the coating 32. A preferred viscosity of the base material 80 is one where the viscosity is low enough to wet out the fibers 81, 83 and where the viscosity is high enough to stay within the fiber matrix, and not run off the wood substrate 80, when heated.

After excess resin 80 is stripped or removed from the first and second fibers 81, 83, the wet fiber assembly is oriented to ensure such that the carbon fibers 81 are longitudinal and the glass fibers 82 are perpendicular to the carbon fibers 81. Further, controlling the flow of the base material 80 during the temperature ramp phase may illustratively require a minimum concentration of 1% by weight of a thixotropic agent in order to hold the resin in place while being cured. Fumed silica is an illustrative thixotropic reagent and operates to change the viscosity of the base material 80. In particular, the uncured coating 32 does not experience any shear forces on its surface as it is being cured because the uncured coating 32 is riding under the sheet release film 152, as is discussed below. Thus, the fumed silica operates to maintain a higher viscosity of the base material 80 as it is being cured in order to prevent the base material 80 from becoming thin and running off the wood substrate 30 and away from the fibers 81, 83. In other words, the fumed silica, or other thixotropic agents, operates to stabilize the viscosity of the base material 80 when the base material 80 is placed under heat and pressure in order to prevent the viscosity of the base material 80 from becoming too thin and running off the wood substrate 30. The amount of thixotropic agent, such as fumed silica, added to the coating 32 may be varied as a function of the ambient temperature of the surrounding environment, the starting viscosity of the coating 32 prior to being cured, and the particular mix of components within the coating 32.

Once the fibers 81, 82 are fed through the resin bath 114 to create the wet, or uncured, fiber-reinforced coating 32, a sacrificial mylar release film 152 is unwound from the spool 150 and onto the top surface of the wet fiber-reinforced coating 32, as shown in FIG. 4, and the wet fiber-reinforced coating 32 and mylar release film 152 are generally simultaneously fed onto the bottom surface 38 of the wood substrate 30. Once the wet (i.e., uncured) resin-filled fabric assembly is properly oriented and placed onto one or more boards 30, the board(s) 30 and wet fiber-reinforced coating 32 layup (i.e., the uncured composite assembly) may then be fed into the pultrusion curing system 104. The sacrificial mylar release film 152 is positioned between the resin-filled fabric assembly, i.e., the wet fiber-reinforced coating 32, and the heated platen 160 in order to protect the heated platen 160 and/or die surface 163 by preventing the wet fiber-reinforced coating 32 from adhering to the surface 163. Further, the mylar film 152 reduces shear forces on the resin bonds within the base material 80 and allows crosslinking within the base matrix 80 prior to the newly-formed composite boards 22 experiencing a load. While the illustrative mylar film 152 is shown, it should be understood that other suitable release films which substantially prevent or minimize the resin-filled fabric assembly from adhering to the heated platen 160 and/or die surface 163 may be used as well.

During this time, a four-ply carrier glass 156 from spools 154 located below the wood substrate 30 is fed onto the top surface 40 of the wood substrate 30. The layup (now including the wood substrate 30, the wet, uncured fiber-reinforced coating 32 atop the wood substrate 30, the mylar release film 152 atop the coating 32, and the carrier glass 156 below the wood substrate 30) is fed into the heated pultrusion die 158. The heated pultrusion die 158 is configured to establish the overall dimension of the layup as it exists the die 158. Accordingly, the exit 161 of the die 158 is configured to define the final dimensions of the fiber-reinforced coating 32 on the wood substrate 30. Particularly, the size of the exit 161 of the pultrusion die 158 operates to define the thickness 42 of the final fiber-reinforced coating 32 of the composite board 22. Once the layup has passed through the die 158, the once wet, uncured fiber-reinforced coating 32 is cured, hardened, and bonded to the bottom surface 38 of the board 30 to form the composite floor board 22. As noted above, the temperature of the die 158 is dependent upon the specific chemistry and combination of components within the coating 32. Typical ranges of operation of the die 158 are between approximately 250-400 degrees C. Illustratively, the carrier glass layer 156 is used as a sacrificial pulling layer of glass on the top surface 36 of the wood substrate 30 in order to improve the pulling capability of the board 30 as the board 30 is pulled through the assembly 100 by the reciprocating pullers 164. The carrier glass layer 156 further provides some additional buffering to any variance in the thickness 34 of the wood substrate 30. The wet layup is pulled through the heated die 162 between the upper and lower die components, or platens, 160, 162 with the use of the pultrusion reciprocating pullers 164, as shown in FIG. 4. Alternatively, a pultrusion caterpillar drive (such as that shown in FIG. 6, for example) may be used as well.

As shown in FIG. 4 and described above, the composite boards 22 may be made through a pultrusion process using the pultrusion assembly 100 described above. Of course, it should be understood that any suitable pultrusion process may be used to form the composite boards 22. For example, the composite boards 22 may alternatively be formed through a double belt press process using a double belt press assembly 200, as shown in FIG. 5. Illustratively, the double belt press assembly 200 includes a coating system 202 and a pultrusion double belt press system 204. The coating system 202 is similar to the coating system 102 described above in regard to the pultrusion process shown in FIG. 4. In particular, the coating system 202 shown in FIG. 5 includes the carbon spools 105 and carbon strands 81, the 90 degree weft glass mat 82, and the resin bath 114. However, each of the carbon spools 106, carbon strands 81, the spool 110 of 90 degree weft glass mat 82, and the resin bath 114 are all located below the wood substrate 30 which is positioned in a right-side-up orientation such that the bottom surface 38 of the board 30 faces downwardly. The coating system 202 further includes a preheater 208, similar to the preheater 108 described in the coating system 102 shown in FIG. 4. The preheater 208 of the double belt press assembly 200 is an oven that includes an upper heating element 207 and a lower heating element 209 spaced-apart from the upper heating element 207. The wood substrate 30 is fed between the upper and lower heating elements 207, 209. As noted above, the wood substrate 30 is preheated in order to reduce process variance and improve surface bonding of the reinforced-fiber coating 32. The fiber-reinforced coating 32 similarly includes the carbon fibers 81 fed from the spools 106 and oriented within the same plane as the 90 degree weft glass mat 82. The carbon fibers 81 are oriented longitudinally along the longitudinal axis 70 of the board 30 while the weft glass fibers 83 of the mat 82 are oriented horizontally along the width of the board 30. As with the pultrusion process, the weft glass fibers 83 of the mat 82 are positioned adjacent the bottom surface 38 of the board 30 while the carbon fibers 81 are positioned adjacent the weft glass fibers 83 and spaced-apart from the bottom surface 38 of the board 30.

Both the glass fibers 83 and the carbon fibers 81 are fed through the resin bath 114 to form the wet fiber-reinforced coating 32. As noted above, the glass and carbon fibers 81, 83 may alternatively be fed through an injection box (not shown). Similar to the pultrusion process described above, a mylar release film 152 on the spool 150 is provided beneath the wet fiber-reinforced coating 32. Illustratively, the mylar release film 152 operates to protect the double belt press system 204 from the wet fiber-reinforced coating 32. As noted above, the wet fiber-reinforced coating 32 is positioned on the bottom surface of the board 30 as the board 30 is fed through the double belt press system 204. Thus, the mylar release film 152 is also positioned below the board 30 in order to be placed on the outside, or exposed surface of the uncured fiber-reinforced coating 32.

Once the fiber-reinforced coating 32 and the mylar film 152 is placed onto the bottom, outer surface 38 of the board 30, the layup (including the board 30, the wet fiber-reinforced coating 32, and the mylar film 152) is fed into the heated double belt press system 204 shown in FIG. 5. Illustratively, the double belt press system 204 includes an upper assembly 210 and a lower assembly 212. Each assembly 210, 212 includes two wheels 214 (at least one of each of which is a drive wheel while the other may be a driven wheel), a belt 216 that is carried on the wheels 214 and a heater element 220 positioned between upper and lower belt portions of each assembly 210, 212, as shown in FIG. 5.

The heated double belt press system 204 operates to cure the wet fiber-reinforced coating 32 (including the base matrix 80, carbon fibers 81, and glass fibers 83). The double belt press system 204 also operates to pull the board 30 and wet fiber-reinforced coating 30 through the process while simultaneously heating and curing the fiber-reinforced coating 32 onto the board 30 to create the composite board 22 including the hardened fiber-reinforced coating 32. Illustratively, the double belt press system 204 is an isobaric press such that the pressure exerted across the layup, including the board 30 and the fiber-reinforced coating 32, is constant as the board 30 and fiber-reinforced coating 32 is pulled therethrough. In particular, the pressure exerted across the layup is between approximately 5-25 psi. The pressure exerted by the double belt press 204 is constant and independent of any thickness variation of the layup (including the board 30 and fiber-reinforced coating 32).

Figure 7:
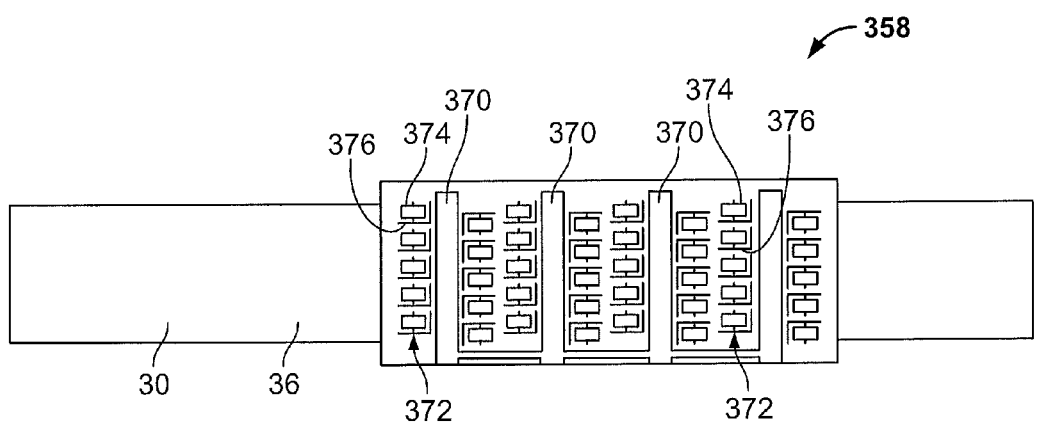
FIG. 7 is a schematic illustration of an isobaric press assembly shown in FIG. 6 including pneumatic bellows and rocker-arm pressure wheels.
Figure 8:
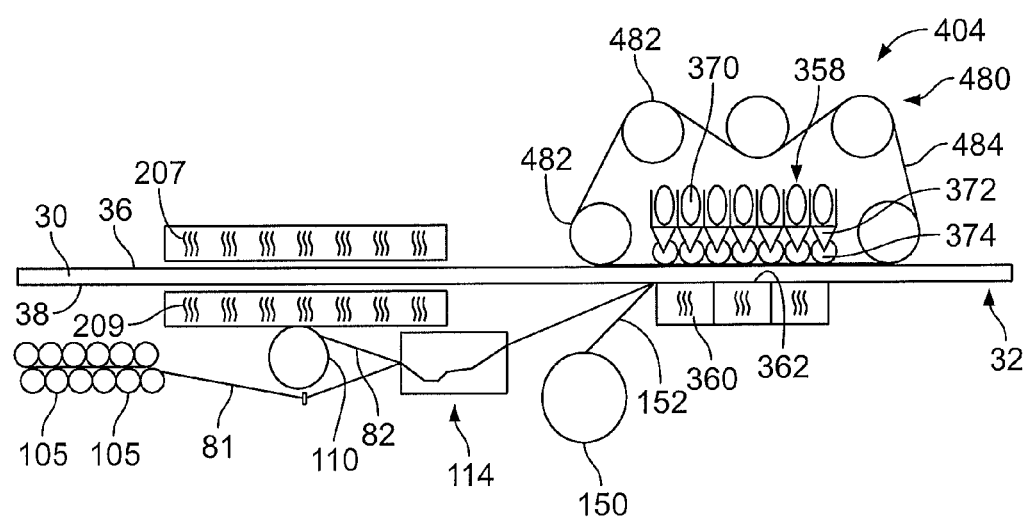
FIG. 8 is a schematic illustration of an alternative process similar to that shown in FIG. 6 for making the composite floor boards of the present disclosure and showing an alternative isobaric pressure assembly configured with a belt press drive.

Looking now to FIGS. 6-8, the composite boards 22 may further alternatively be formed through an isobaric compositing process using an isobaric pressure assembly 300, as shown in FIG. 6. Illustratively, the isobaric pressure assembly 300 includes a coating system 302 and an isobaric pressure system 304. The coating system 302 is similar to the coating systems 102, 202 described above. In particular, the coating system 302 includes the plurality of spools 105 of carbon fibers 81, the spool 110 of 90 degree weft glass mat 83, the resin injection box 114, and the spool 150 of mylar film 152. Illustratively, these components of the coating system 302 are positioned below the wood substrate 30, as shown in FIG. 6. Such positioning of the coating system 302 is the same as that of the coating system 202 of the double belt press assembly 200. The preheating oven 208 of the coating system 302 includes the upper heating element 207 and the lower heating element 209 between which the wood substrate 30 passes in order to reduce process variance and improve the surface bonding of the fiber-reinforced coating 32 applied to the bottom surface of the wood substrate 30.

The isobaric pressure system 304 includes an isobaric pressure mechanism 358 positioned above the wood substrate 30 and a heated element, or platen, 360 positioned below the wood substrate 30. The mylar film 152 protects the facing surface 362 of the heated platen 360 from the wet fiber-reinforced coating 32. As shown in FIGS. 6-7, the isobaric pressure mechanism 358 includes a plurality of pneumatic bellows 370 positioned perpendicular to the longitudinal access 70 of the wood substrate 30. The isobaric pressure mechanism 358 further includes a plurality of rocker-arm pressure wheels 372 positioned on either side of each of the pneumatic bellows 370. Pressure imbalances on the wood substrate 30 and fiber-reinforced coating 32 may create hydraulic pressures that affect the mobility of the base matrix 80 of the coating 32 and may create defects in the coating 32. Isobaric pressure is created through the array of rocker-arm pressure wheels 374 each provided on independent rocker arms 376. The rocker arms 376 move independently to unique thicknesses while maintaining a uniform pressure from the shared pneumatic bellow 370. Illustratively, the pressure exerted across the layup is between approximately 5-25 psi. The isobaric pressure system 304 operates to cure the wet fiber-reinforced coating 32 as the layup is pulled through the assembly 300 by either a pultrusion reciprocating puller (not shown) or a pultrusion caterpillar drive mechanism 380, as shown FIG. 6. The pultrusion caterpillar drive mechanism 380 includes an upper drive belt 382 and a lower drive belt 384 which operate together to pull the board 30 through the press mechanism 358. Isobaric pressure is distributed across the layup (including the board 30 and the fiber-reinforced coating 32) during the cure phase to aid the stability of the base matrix 80 of the coating 32.

In an alternative isobaric pressure system 404, shown in FIG. 8, a belt drive assembly 480 may be used with the isobaric mechanism 358 in order to pull the wood substrate 30 through the system 400. As illustratively shown in FIG. 8, the belt drive assembly 480 includes five wheels 482 (at least one of which is a drive wheel while the others of which may be driven wheels) positioned around the isobaric mechanism 358. A belt 484 is wound around and attached to the wheels 482. Two wheels 482 are positioned on either end of the isobaric mechanism 358 and the belt 484 extends between these two wheels 482 to be positioned over and engaged with the top surface 36 of the wood substrate 30. The wheels 482 are configured to rotate in a counterclockwise direction in order for the belt 484 to continually move the wood substrate 30 to the right, as shown in FIG. 8.

The above-referenced methods operate to manufacture the fiber-reinforced coating 32 and to cure base material 80 on the wood substrate 30, rather than manufacturing the fiber-reinforced coating 32 to a cured state and then subsequently adhering the already-cured coating 32 to a wood substrate 30. In other words, the above-referenced methods apply a "wet", or uncured fiber-reinforced coating onto a substrate and use heat to cure the fiber-reinforced coating while the fiber-reinforced coating is on the wood substrate. In fact, the above-referenced methods eliminate the secondary process of using a reactive hot melt polyurethane adhesive, for example, to adhere the preformed (and pre-cured) coating in sheet form to the wood substrate. An additional adhesive or adhering step (with or without the use of a separate adhesive) is not required by the above-referenced methods of the present disclosure. As such, the methods discussed in FIGS. 4-8 above provide a method of making a composite panel using a single, continuous manufacturing line.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of making a composite panel configured for use with a flooring assembly of a trailer comprising:
   providing a wood substrate;
   making an uncured fiber-reinforced coating;
   applying the uncured fiber-reinforced coating onto a surface of the wood substrate; and
   curing the uncured fiber-reinforced coating after applying the uncured fiber-reinforced coating onto the surface of the wood substrate.

2. The method of claim 1, wherein making the uncured fiber-reinforced coating includes (i) orienting a plurality of individual fiber rovings along a longitudinal axis of the wood substrate, (ii) positioning a fiber mat adjacent the plurality of individual fiber rovings, and (iii) feeding the plurality of fiber rovings and the fiber mat through a resin bath.

3. The method of claim 2, wherein the fiber mat includes a plurality of uni-directional fibers, and wherein positioning the fiber mat adjacent the plurality of individual fiber rovings includes orienting the plurality of uni-directional fibers of the fiber mat perpendicular to the plurality of individual fiber rovings.

4. The method of claim 2, wherein applying the uncured fiber-reinforced coating includes placing the fiber mat directly adjacent the surface of the wood substrate.

5. The method of claim 1, further comprising applying a release film on top of adjacent an outer surface of the uncured fiber-reinforced coating before curing the uncured fiber-reinforced coating.

6. The method of claim 1, wherein curing the uncured fiber-reinforced coating includes advancing the wood substrate, including the uncured fiber-reinforced coating thereon, through a heated die.

7. The method of claim 1, wherein curing the uncured fiber-reinforced coating includes advancing the wood substrate, including the uncured fiber-reinforced coating thereon, through a heated double belt press.

8. The method of claim 7, wherein the double belt press is an isobaric double belt press.

9. The method of claim 1, wherein curing the uncured fiber-reinforced coating includes advancing the wood substrate, including the uncured fiber-reinforced coating thereon, between an isobaric pressure assembly and a heated platen.

10. The method of claim 9, wherein the isobaric pressure assembly includes a plurality of rocker-arm pressure wheels in fluid communication with one or more pneumatic bellows.

11. The method of claim 9, wherein the isobaric pressure assembly includes a belt drive.

12. The method of claim 1, further comprising preheating the wood substrate prior to applying the uncured fiber-reinforced coating onto the surface of the wood substrate.

13. A method of making a composite panel configured for use with a flooring assembly of a trailer comprising:
   providing a wood substrate;
   making an uncured fiber-reinforced coating;
   applying the uncured fiber-reinforced coating directly onto a surface of the wood substrate without the use of an adhesive between the uncured fiber-reinforced coating and the surface of the wood substrate to create an uncured composite assembly; and
   applying heat to the uncured composite assembly in order to cure the uncured fiber-reinforced coating on the wood substrate.

14. The method of claim 13, further comprising applying a release film on top of the uncured fiber-reinforced coating before applying heat to the uncured fiber-reinforced coating.

15. The method of claim 13, wherein the composite panel consists of a wood substrate defining a longitudinal axis, and a coating including a (i) plurality of first fibers configured to extend perpendicular to the longitudinal axis of the wood substrate, (ii) a plurality of second fibers configured to extend parallel to the longitudinal axis of the wood substrate, and (ii) a resin matrix around the plurality of first and second fibers.

16. The method of claim 13, wherein making the uncured fiber-reinforced coating including (i) orienting a plurality of individual fiber rovings along a longitudinal axis of the wood substrate, (ii) positioning a fiber mat adjacent the plurality of individual fiber rovings, and (iii) advancing the plurality of fiber rovigins and the fiber mat through a resin bath, and wherein applying the uncured fiber-reinforced coating includes orienting the uncured fiber-reinforced coating to locate the fiber mat adjacent the surface of the wood substrate and to locate the plurality of individual rovings spaced-apart from the surface of the wood substrate to position the fiber mat between the surface of the wood substrate and the plurality of fiber rovings.

17. The method of claim 16, wherein making the uncured fiber-reinforced coating further includes adding at least one of clay and fumed silica to the resin bath.

18. The method of claim 13, further comprising applying constant pressure to the uncured composite assembly.

19. The method of claim 18, wherein the constant pressure is approximately between 5-35 psi.

20. The method of claim 18, wherein applying the constant pressure includes advancing the uncured composite assembly through an isobaric pressure system including an isobaric pressure mechanism having a plurality of pneumatic bellows and a plurality of rocker-arm pressure wheels coupled to the plurality of pneumatic bellows.

21. The method of claim 13, further comprising abrading the surface of the wood substrate before applying the uncured fiber-reinforced coating directly onto the surface of the wood substrate.

22. A method of making a composite panel configured for use with a flooring assembly of a trailer comprising:
   advancing a wood substrate through a coating system to apply a wet, uncured fiber reinforced coating to one surface of the wood substrate to create an uncured composite assembly; and
   advancing the uncured composite assembly through a curing system to apply heat to the uncured composite assembly and cure the uncured fiber reinforced coating when the fiber reinforced-coating is on the wood substrate in order to create the composite panel, wherein advancing the wood substrate through the coating system and advancing the uncured composite assembly through a curing system occur in a single, continuous manufacturing line.

* * * * *